United States Patent [19]

Hennessy et al.

[11] Patent Number: 4,809,168

[45] Date of Patent: Feb. 28, 1989

[54] PASSIVE SERIALIZATION IN A MULTITASKING ENVIRONMENT

[75] Inventors: James P. Hennessy; Damian L. Osisek, both of Woodstock; Joseph W. Seigh, II, Red Hook, all of N.Y.

[73] Assignee: International Business Machines Corporation, Armonk, N.Y.

[21] Appl. No.: 920,002

[22] Filed: Oct. 17, 1986

[51] Int. Cl.⁴ ............................................. G06F 13/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,573,736 | 4/1971 | Schlaeppi | 364/200 |
| 3,947,823 | 3/1976 | Padegs et al. | 364/200 |
| 4,189,771 | 2/1980 | Roever | 364/200 |
| 4,224,664 | 9/1980 | Trinchieri | 364/200 |
| 4,318,174 | 3/1982 | Suzuki et al. | 364/200 |
| 4,384,324 | 5/1983 | Kim et al. | 364/200 |
| 4,604,694 | 8/1986 | Hough | 364/200 |
| 4,663,709 | 5/1987 | Fujiwara et al. | 364/200 |

Primary Examiner—Thomas M. Heckler
Attorney, Agent, or Firm—Mark S. Walker; J. Dennis Moore

[57] ABSTRACT

In a multi-processing computer system, a method for serializing references to shared data objects, such as pages, tables, and the like, that permits the system processes to reference objects on a shared access basis without obtaining a shared lock. A point of execution of the control program is monitored that is common to all processes in the system, which occurs regularly in the execution of each process and across which no references to any data object can be maintained by any process, except references using locks. A system reference point is established, which occurs after each process in the system has passed the monitored point of execution at least once since the last such system reference point. Operations requiring exclusive access, such as modification or destruction of the data object, are performed by, first, obtaining a conventional exclusive lock, then preventing any subsequent references to the data object, waiting until two of the system reference points have occurred, and, finally, performing the operation. Significant reductions in overhead can be achieved through the application of the invention.

10 Claims, 4 Drawing Sheets

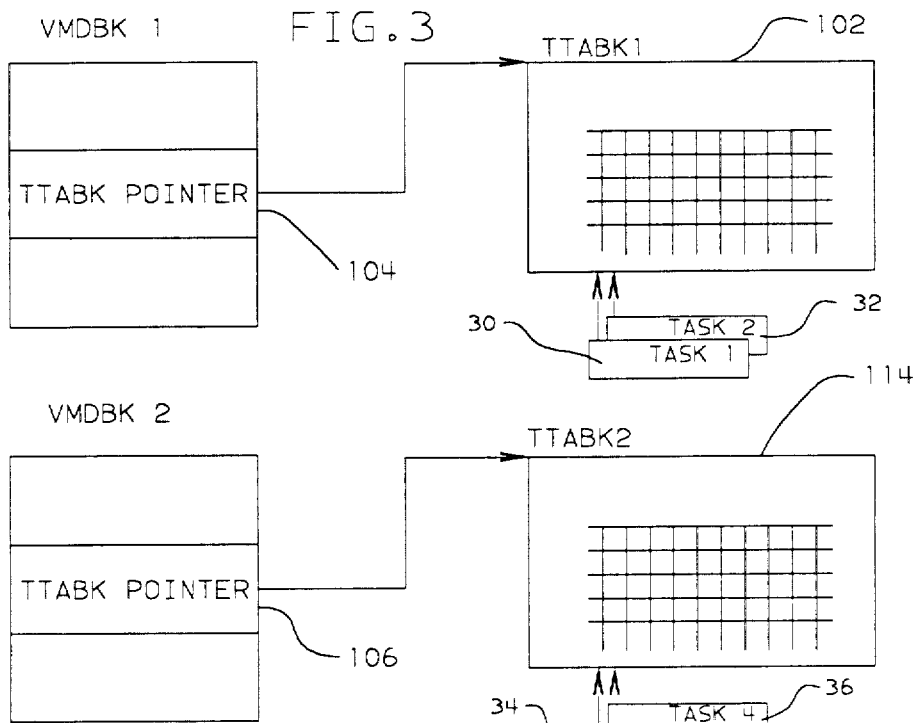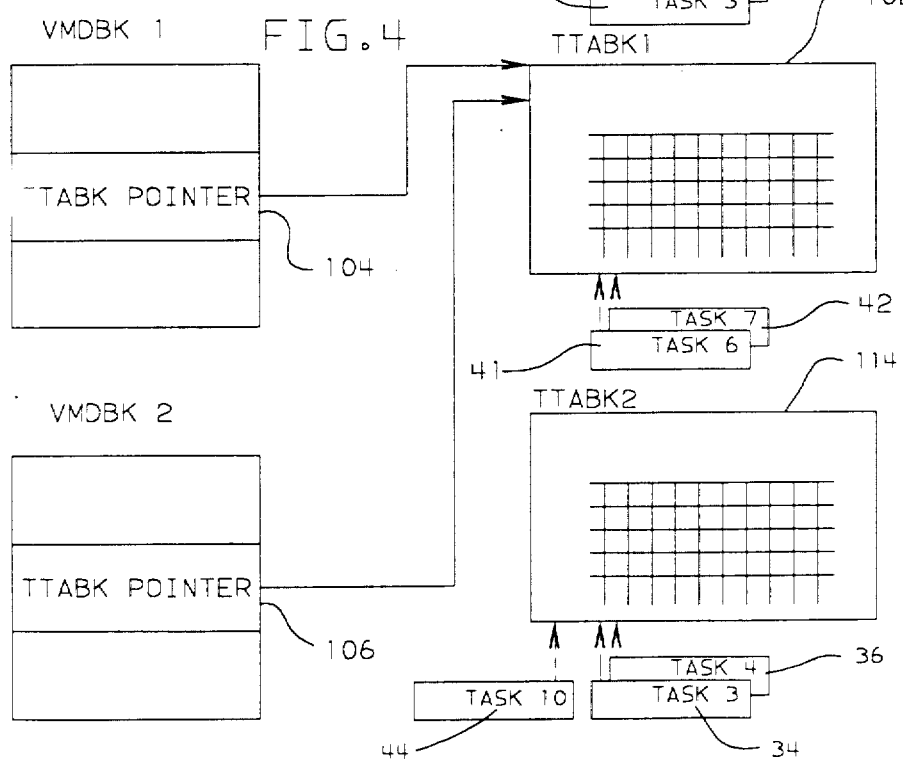

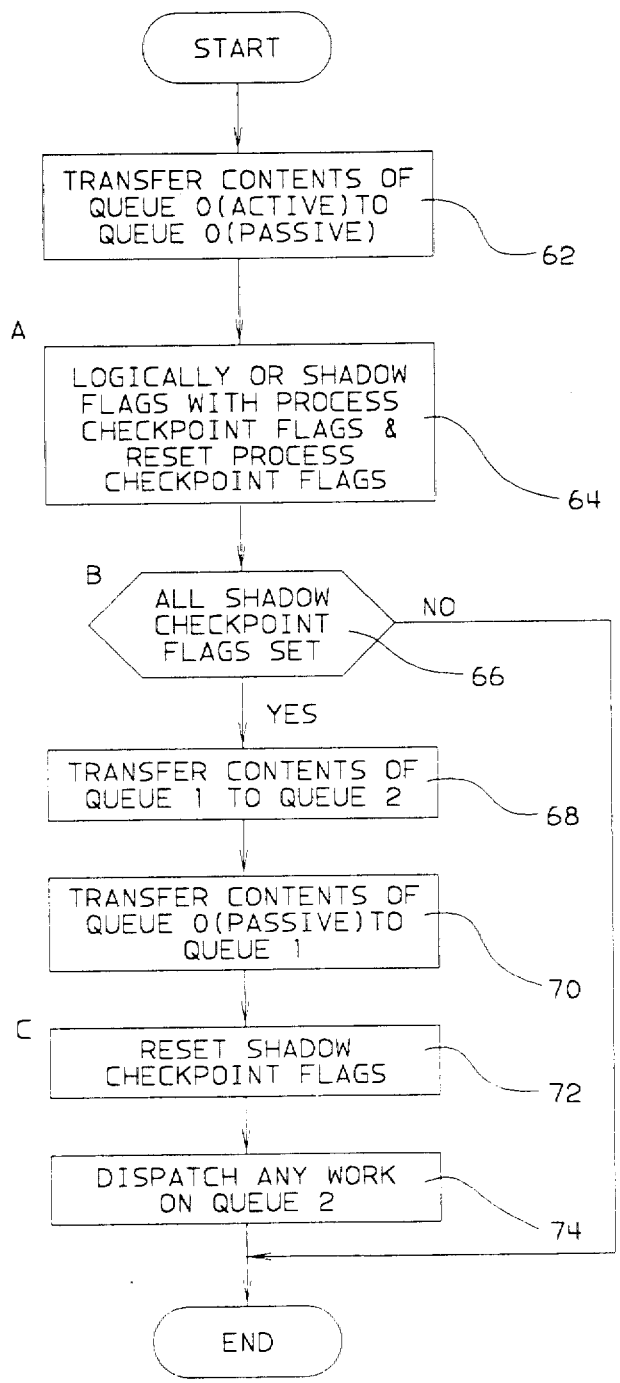

PASSIVE SERIALIZATION IN A MULTITASKING ENVIRONMENT

BACKGROUND OF THE INVENTION

1. Field of the Invention

The present invention relates to multi-processing systems having a plurality of computer processors, and to multitasking systems capable of asynchronously executing a plurality of tasks, and more particularly relates to a serialization mechanism to control system events, for example the referencing of data objects.

2. Background Art

It is frequently necessary in multitasking and multiprocessing systems to have serialization mechanisms to control system events, for example the referencing of shared data objects. These mechanisms may be critical to preserve the integrity of data, for example where a shared data object is to be destroyed. Serialization controls system events so that certain resource references occur serially, i.e. one task reference at a time, in an environment designed to allow multiple resource references, i.e. parallel references. Serialization prevents a task from using resources or data that are already being used by an interrupted or concurrently executing task, until that task has finished using the resources or data. Serialization ensures the integrity of accesses to data, the consistency of accesses to interrelated data, and the exclusivity of control over resources, among competing tasks.

U.S. Pat. No. 3,947,823 to Padegs et al. entitled "Means for Coordinating Asynchronous Main Store Access In A Multiprocessing System Using Virtual Storage", commonly assigned, discloses a unique control circuit in a multi-processing system which uses demand-paging and virtual addressing. The circuit implements serialization by maintaining the addressability of an invalidated page frame until execution is completed for all current instructions in all processors. The circuit utilizes pairs of addressability registers, associated availability control triggers and other circuit elements to ensure the preservation of the invalidated page frame until all current instructions in all processors are completed.

The present invention provides a serialization mechanism that may be implemented entirely in software, eliminating the need for special purpose registers and other hardware. The invention also adds minimal overhead to an existing control program.

In addition, conventional, prior art serialization has typically been implemented by way of locks. Locks add a significant amount of overhead to the system control program since every reference to a resource must access the lock, even when exclusive control is not required. It is desirable to eliminate the use of locks where possible.

Accordingly, it is an object of the present invention to provide a serialization mechanism, for example for references to data objects, such as page frames, tables, and the like, which may be implemented entirely in software. It is another object of the invention to provide such a serialization mechanism which can be implemented in a manner that adds minimal overhead to an existing control program. It is a still further object of the present invention to provide a serialization mechanism that eliminates the necessity of shared locks for operations that require only shared access to a data object.

SUMMARY OF THE INVENTION

The present invention provides in a multitasking or multi-processing system having a control program, a method for serializing system events. System events occur during the execution of tasks or processes. According to the invention, the processes are permitted to begin and terminate certain intervals of execution without explicit indication of those events. A point of execution of the control program which is common to all system processes, which occurs regularly in the processes' execution, and which is not in any such interval, is monitored in the system. A system reference point is established which occurs after each process in the system has passed such point of execution at least once since the last such system reference point.

The present invention thus has applicability to, for example, access to shared data objects, and permits shared access to data objects without the use of locks, thus eliminating a potentially very large amount of overhead from the use of such locks. By simply imposing the method of the present invention within a control program, references to data objects on a shared basis are permitted without the need of any lock whatsoever. When a process requires exclusive access to a data object to avoid invalid references to the data object by other processes, according to an embodiment of the present invention, after an exclusive-access request to such a selected data object, subsequent references by other processes to the selected data object are prevented. The system then waits until two of such system reference points have occurred and only then performs the requested exclusive-access operation. This assures that all references by processes within the system, which might be invalidated by the operation requiring exclusive access, are completed before the operation requiring exclusive access is allowed to execute. The additional operating time involved in the execution of an operation requiring exclusive access is, in many systems, more than a fair price to pay for the reduction in overhead associated with the dispensing of shared locks in many other operations by the system. The present invention relates to a method of passive serialization, implemented without the requirement of active mechanisms such as locks.

The foregoing and other objects, features and advantages of the invention will be apparent from the more particular description of the preferred embodiments of the invention, as illustrated in the accompanying drawings.

BRIEF DESCRIPTION OF THE DRAWINGS

FIG. 3 is a diagram similar to that of FIG. 2, but showing the aforementioned corresponding field in each virtual machine control block pointing to different, not commonly shared data blocks.

FIG. 4 is a diagram similar to that of FIGS. 2 and 3, showing both pointers referred to in connection with FIG. 2 pointing again to the commonly shared data block, prior to the destruction of one of the previously locally referenced data blocks.

Detailed Description of the Preferred Embodiment

Figure 1:
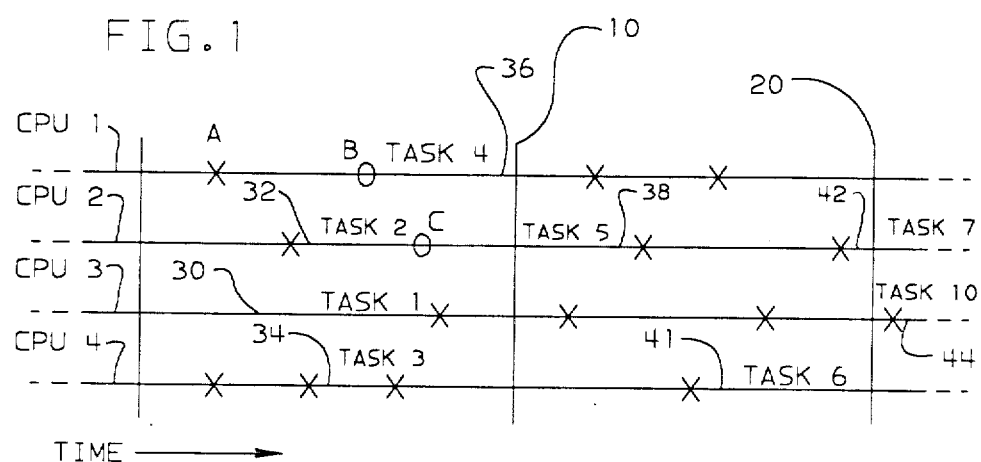
FIG. 1 is a timing chart showing the series of system events in a multi-processing system which includes four processors.

For the purposes of the detailed description of the preferred embodiment of the present invention, the following general definitions apply.

Data Object—A data structure. Examples are simple control blocks, lists, queues, and page frames.

Data Operation—operations on data objects. Examples are push and pop from a stack.

Data Reference—Having the address of, or a pointer to an object. (A data object must be referenced by a process to perform operations on it.) The duration of a reference can be one or more instructions.

Exclusive Access—Operations that require exclusive access execute one at a time via a traditional serialization mechanism such as an exclusive lock.

Shared Access—Operations that require shared access are allowed to execute concurrently via the prior art mechanism of a shared lock, or shared access according to the preferred embodiment.

In addition, for the purpose of describing the detailed description of the present invention, the following definitions apply particularly to the preferred embodiment:

Process Checkpoint—designated point or points of execution that occur in each process and are relatively frequent. It is an event recorded by setting a boolean variable such as a bit. The boolean variable is referred to as a "process checkpoint flag".

Deferred Work—Work deferred until after all processes have passed through a process checkpoint since the defer was requested.

Multiprocess Checkpoint—A reference point in the system processing which is designated when all processes have been determined to have passed through their process checkpoint since the last multiprocess checkpoint. The determination is done on a periodic basis.

The preferred embodiment, tracks process references to an object in a multi-processing system, by monitoring a point in the operation of the control program at which no continuing object references by processes are allowed, except conventional serialized references, i.e., references which rely on locks for serialization. This is termed a process checkpoint.

It should be understood that, in general, application of the invention is not limited to the monitoring of references by hardware processors alone. Processors are themselves part of a larger category of "processes" which includes, for example, tasks in multi-tasking operating systems, virtual processors, and the like.

To effect shared access references according to the preferred embodiment of the present invention it is required that no such references by a process be maintained across such a process checkpoint.

For operations requiring exclusive access, for example the destruction of a data object, it is necessary to prevent any subsequent shared references to the object. This is accomplished by deleting any pointers to the object or by changing any pointers to the object to another copy or instance of the object and by obtaining a conventional exclusive access lock, if necessary. It may be necessary to apply normal locking or serialization for this as the pointers may be part of other data objects. Then, it is necessary to wait until any previous references to the object by operations using this passive serialization method are complete. This is done quite easily in accordance with the preferred emobdiment, and is described in more detail below. Once previous shared access references using passive serialization are complete, the operation requiring exclusive access to the object may then be performed.

It should be noted that since one of the methods of preventing any subsequent references to a data object is to substitute another instance of the object, it is possible to have more than one instance of the data object at the same time in the system.

It was mentioned above that in conjunction with operations requiring exclusive access, it is necessary to wait until previous references to the object are completed. The obtaining of an exclusive lock only ensures that no other references of the conventional type remain on the data object. It does not ensure that shared access references using passive serialization no longer exist. It is therefore necessary to employ the multiprocess checkpoint determination to ensure that such references no longer exist. This requires the deferral of the work requiring exclusive access. Work so deferred is referred to herein as "Deferred Work".

A unit of Deferred Work is delayed until after two multiprocess checkpoints have occurred. This ensures that all process have passed through a process checkpoint at least once since the Deferred Work was scheduled and, therefore, that there are no longer any references to that object. This is illustrated in FIG. 1. Note in connection with the figure that a multiprocess checkpoint is a cumulative event. It is the result of each relevant process checking in at a process checkpoint. Once all processes have checked in in this manner, a multiprocess checkpoint is declared. However, having passed a process checkpoint a process is not prevented from making a subsequent reference to the data object of concern. Thus, in FIG. 1, at point A a task on processor 1 passes a process checkpoint denoted by an "x". At point B, which occurs before the next multiprocess checkpoint 10, a second task on processor 1 makes a reference to the data object of concern, denoted by an "o". At point C subsequent shared references are prevented. The next multiprocess checkpoint 10 is passed, and it is clear that even though subsequent shared references to the data object were prevented, it cannot be guaranteed that all other processes have completed their references to the data object of concern. In this example, task 4 36 on processor 1 could still be referencing the object at multiprocess checkpoint 10. However, this guarantee can be given following the next multiprocess checkpoint 20. Thus, the deferred work 44 can acquire control at point D.

In general, the preferred embodiment of the present invention is implemented in two operations: (1) Deferred Work processing, and (2) multiprocess checkpoint determination and processing.

Deferred Work Processing

The Deferred Work function is invoked to defer work requiring exclusive access for a period of two multiprocess checkpoints to ensure no previous shared access references using passive serialization are still held. This function queues the work to be processed by the multiprocess checkpoint processing function. This is discussed in more detail below in connection with the exemplary process code for implementation.

Multiprocess Checkpoint Determination and Processing

Multiprocess checkpoint determination is done on a periodic basis. A check is made to see if all process checkpoint flags are set, i.e. all processors have passed through a process checkpoint since the last multiprocess checkpoint. If they have, then a multiprocess checkpoint is designated, the process checkpoint flags are reset and any deferred work for which two multiprocess checkpoints have occurred is processed.

The processing of work for which two multiprocess checkpoints have occurred and the resetting of the process checkpoint flags do not have to occur in any particular order, but resetting the process checkpoint flags first will increase the probability of another multiprocess checkpoint occurring on the next multiprocess checkpoint determination.

Since a multiprocess checkpoint is defined such that all process checkpoint flags were set at least once since the previous multiprocess checkpoint, the multiprocess checkpoint must be designated before any process checkpoint flags are reset. This is important in implementations in which the time at which it is recognized that a multiprocess checkpoint occurred is not identical to the time at which the multiprocess checkpoint is designated.

The preferred embodiment of the present invention may be implemented in conjunction with either of two methods. The first method is the simpler and more straightforward of the two. The second method is one that was actually implemented in conjunction the IBM VM/XA Systems Facility Release 2, which took advantage of existing code that provided convenient process points to use as process checkpoints.

METHOD 1

Figure 5A:
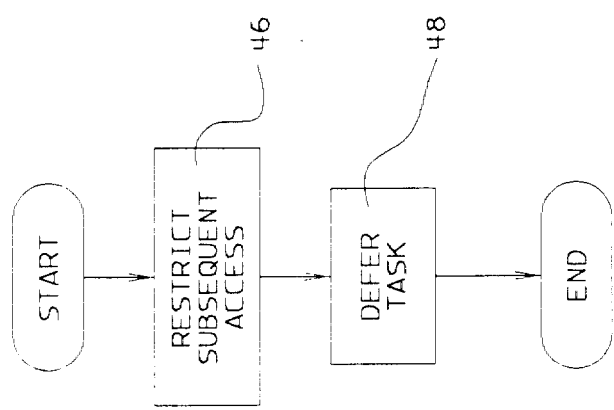
FIG. 5, which consists of FIGS. 5a, 5b and 5c, contains flow charts of the methods according to the present invention.

As shown in FIG. 5a, Deferred Work processing is accomplished by identifying the task requiring exclusive access to a data object, restricting further access to that object 46, and by placing the identified task in a queue 48 to await the passing of two multiprocess checkpoints.

Figure 5B:
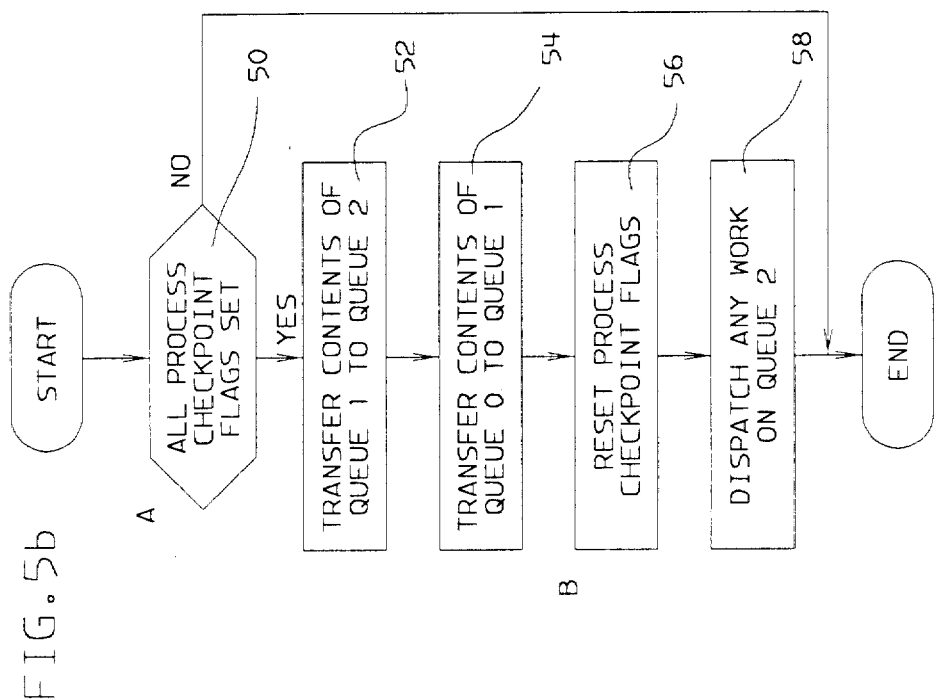

In order to keep track of the number of multiprocess checkpoints occurring for each item of Deferred Work there are three deferred work queues in the preferred embodiment.

q0—work for which 0 MP checkpoints have occurred
q1—work for which 1 MP checkpoint has occurred
q2—work for which 2 MP checkpoints have occurred FIG. 5b is a flow chart showing the processing steps associated with multiprocess checkpoint determination and processing. The method first checks to determine whether all processes have passed a process checkpoint 50. If so, a multiprocess checkpoint is declared.

When an multiprocess checkpoint is designated all deferred work for which 1 MP checkpoints had occurred become Deferred Work for which 2 MP checkpoint has occurred 52, and all Deferred Work for which 0 MP checkpoint had occurred become Deferred Work for which 1 MP checkpoints have occurred 54. Since this information is kept in the form of queues, the multiprocess checkpoint manifests itself by the updating of the queues. All process checkpoint flags are reset 56. Any deferred tasks in q2 are enabled to execute 58.

The following code is an example of an implementation of one embodiment of the present invention
Deferred Work Processing:
restrict subsequent access queue work onto q0
Multiprocess checkpoint determination and processing:
if all process checkpoint flags set then
designate multiprocess checkpoint by updating queues
transfer q1 to q2
transfer q0 to q1
reset process checkpoint flags
dispatch work on q2
endif

METHOD 2

This is a variation on method 1 for use where there is already some process checkpointing going on to monitor processes.

Deferred Work processing is accomplished as in method 1.

In order to keep trach of the number of MP checkpoints occurring for each item of Deferred Work there are four deferred work queues.

q0—work for which 0 MP checkpoints have occurred
this has two parts
q0a—active (newly deferred work)
q0p—passive (holds work between tentative and actual MP Checkpoint designations)
q1—work for which 1 MP checkpoint has occurred
q2—work for which 2 MP checkpoints have occurred The following code is an example of the implementation of these functions:
Deferred Work Processing:
restrict subsequent access
queue work onto q0a
The multiprocess checkpoint determination and processing:
tentatively designate MP checkpoint by transferring q0a to q0p
do for all actual process checkpoint flags
  if actual process checkpoint flag set then
    reset actual process checkpoint flag
    set shadow process checkpoint flag
  endif
enddo
if all shadow process checkpoint flags set then
MP checkpoint occurred
transfer q1 to q2
transfer q0p to q1
reset shadow process checkpoint flags
dispatch work on q2
endif FIG. 5c is a flowchart showing the processing steps comprising multiprocess checkpoint determination and processing according to this second method.

Since some checkpoint processing is already occurring and using the checkpoint flags, the multiprocess determination process must use shadow flags rather than the actual checkpoint flags. Processing first designates a tentative multiprocess checkpoint 62. Then all checkpoint flags are checked, and, if set, a shadow flag is set and the checkpoint flag reset 64. Finally, the shadow flags are checked to determine whether or not an actual multiprocess checkpoint has yet occurred 66. If a multiprocess checkpoint is determined to have happened then only q2, q1, and q0p contain the deferred work when the multiprocess checkpoint is designated to have occurred. The multiprocess checkpoint is tentatively designated earlier 62 than the point that it was actually recognized 66 because of the requirement that the multiprocess checkpoint occur before any process checkpoint flags get reset. q0a is not included in the adjustment of the queues in multiprocess checkpoint processing since q0a is empty at tentative multiprocess checkpoint designation and if it is nonempty at actual checkpoint designation then its contents are Deferred Work entries added after the tentative multiprocess checkpoint declaration, i.e. they may have been added after one of the process checkpoints comprising the multiprocess checkpoint. The queues are transferred as in method one 68, 70 and the shadow flags reset 72. Work is marked enabled for dispatch from q2 74.

The preferred embodiment was implemented in connection with the VM/XA SF control program in the enhancement of the "SET CPTRACE" command to permit tracing by an individual USERID. This new command is implemented in connection with a trace facility. This implementation is explained in detail below to assist the reader in understanding how to apply the invention.

By way of background, a trace facility is a facility which permits a control program to keep track of all events of a particular kind for a period of time extending back by a predetermined time, on a continuing basis, and stores them in a table. This provides a tool to determine what went wrong if a system has a sudden failure (a "crash"). After a crash, the table wherein the designated events were recorded can be analyzed to derive a history of events for the specified time period immediately preceding the crash.

Examples of the kind of event information stored by a trace facility are information concerning what VMDBKs (virtual machine descriptor blocks) are dispatched, information concerning what task is dispatched, and information concerning the address of a piece of work that is dispatched. That information provides the history of the "dispatcher" portion of the control program. Other kinds of information stored by the trace facility are system interruptions, program checks, machine checks and I/O interrupts.

The kinds of data that are gathered and stored by the trace facility may be individually tailored by a user (virtual machine). The means by which this selection, or filtering, is effected is a trace code table. By setting certain bits on or off in the table, selected data can be stored or not stored, as the case may be. The trace code table is therefore a data block which embodies the selection criteria associated with a particular virtual machine. More detailed information about the trace facility and the trace code tables may be found in the *IBM System/370 Extended Architecture, Prinicples of Operation,* the *CP Commands* manual, and the *Diagnosis Guide* and the *CP Diagnosis Reference* manual. Vols. I and II, for the IBM VM/XA Systems Facility Release 2, available from IBM Corporation (Document Nos. SA22-7085, GC19-6215-3, LY27-8044-1, LY27-8045, and LY27-8046, respectively).

Of significance to the preferred embodiment of the present invention is the fact that a trace code table may be the common table or a private table, as specified by the SET CPTRACE command. The common trace code table is a set of trace criteria used as a common trace setting for most of the system users. A private trace code table is a special set of trace criteria used as a trace setting for a specific user for collecting trace information specific to that user. A private table is created and destroyed by the SET CPTRACE command. The common table is a permanent table and is neither created nor destroyed.

When a private trace code table is to be destroyed, because the tracing for a particular user has been reset to use the common trace code table, it is necessary to have exclusive access to the private trace code table to avoid the invalidation of an operation which may be ongoing with respect to the private trace code table. The preferred embodiment of the present invention effects this exclusive access to the private trace code table.

In addition, during the creation of a trace table entry it is necessary for users to have shared access to the trace code table. The preferred embodiment of the present invention effects this shared access as well.

Figure 2:
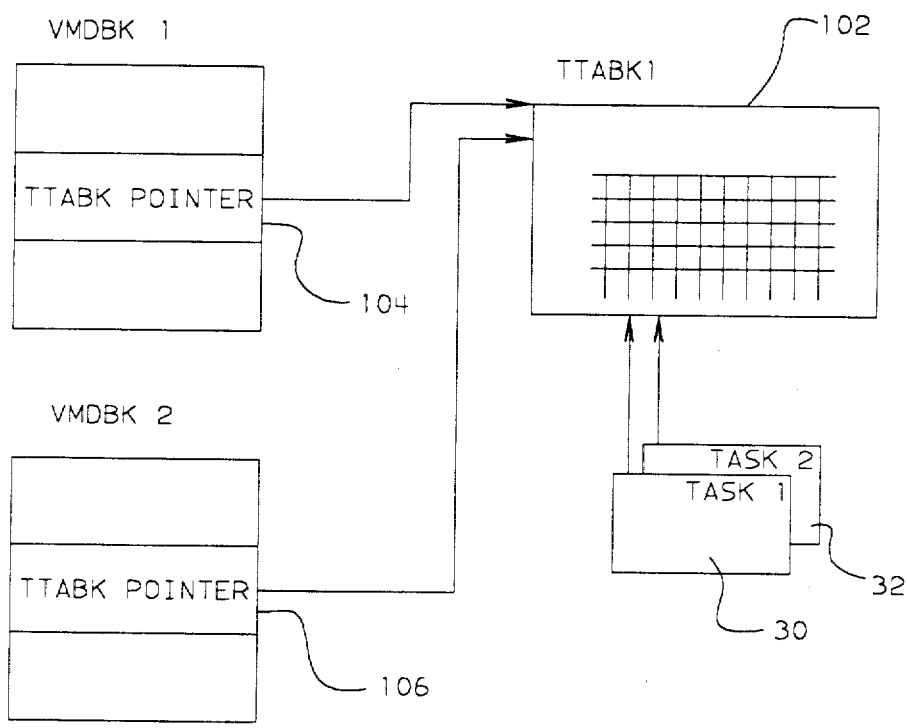
FIG. 2 is a block diagram illustrating virtual machine control blocks in a multi-processor system, in which a corresponding field within each such block contains a pointer which points to the same commonly shared data block.

The circumstances giving rise to the need for exclusive access to the trace code table are illustrated in FIGS. 2–4. The FIG. 1 timing diagram indicates the time sequence of the below listed actions. FIG. 2 illustrates the status of a system having two users, each represented in the system by their respective VMDBKs 1 and 2. In the VMDBK of each user is a field containing a pointer 104, 106 to the commom TTABK1 102, trace code table. This pointer is referenced by all tasks for each user. The TTABK pointer 104, 106 to TTABK1 102 is stored within each task 30, 32.

The system operator may have concerns which cause him to want to have separate trace criteria for user 2. The system operator, therefore executes a command to create a separate, private trace code table TTABK2 114. The system status following the execution of this command is illustrated in FIG. 3. User 2's VMDBK pointer field to TTABK 106 contains a value pointing to the private TTABK2 114 just created. All newly dispatched tasks reference this pointer value for user 2. Thus, Tasks 3 and 4 34, 36 incorporates the new pointer.

Now, if the system operator wishes to cease using separate trace criteria for user 2, and resets the specific trace for user 2, returning user 2 to the use of the common TTABK1 102, as shown in FIG. 4, it is necessary that the private TTABK2 114 be destroyed to return that storage resource to the system.

It is necessary to employ a serialization mechanism to provide exclusive access for the destruction of the private table to assure that no reference to that table (using user 2's VMDBK) is in progress when it is destroyed. For example, tasks 3 and 4 34, 36 could still be referencing the table as shown in FIG. 4. The operator command to cease using TTABK2 114 causes a TTABK destroy task, Task 10 44, to be placed on the deferred work queue. After two multiprocessor checkpoints have passed, ensuring that Tasks 3 and 4 34, 36 have completed their reference, Task 10 44 is enabled and allowed to destroy TTABK2 114. If conventional locks were employed to provide this serialization, a considerable amount of overhead would be utilized. References to the trace code table are simply too frequent, and the system would be bogged down executing the instructions involved in applying and releasing conventional locks to effect shared access every time the trace code table was referred to in order to create a trace table entry.

By applying the preferred embodiment of the present invention it becomes apparent that this potentially enormous extra overhead is effectively eliminated. In VM/XA, processes are dispatched non-preemptively;

that is, once a process begins or resumes execution on a processor, it continues to execute on that processor until it explicitly relinquishes control. Because these losses of control occur at known points in each process, they can serve as the process checkpoints. Moreover, any process in the system which is not presently executing on a processor is necessarily suspended at one of these loss-of-control points, i.e., at a process checkpoint. Thus, VM/XA can and does monitor process checkpoints by means of processor checkpoints: only one checkpoint flag per processor is needed, rather than one per process. Each processor's flag is set by the dispatcher whenever the currently executing process relinquishes control. Once all processor checkpoint flags are set, it is clear that every process in the system either is suspended at or has passed through a process checkpoint.

In implementation of the preferred embodiment in VM/XA entry to the dispatcher, and setting a flag therein, is considered the process checkpoint.

Multiprocess checkpoint determination is in unresponsive processor detection, a timer driven routine which checks the process checkpoints to detect unresponsive processors, ones which do not set process checkpoints on a timely basis.

Deferred Work processing is a new routine which places a CPEBK, a unit of work, onto a deferred work queue.

Thus, while the invention has been described with reference to preferred embodiments thereof, it will be understood by those skilled in the art that various changes in form and details may be made without departing from the scope of the invention. For example, the invention has been described in connection with the referencing of shared data objects. The invention may be applied in other instances where serialization of computer system events is necessary or desirable. For example, it may be desirable to serialize intervals of code in which processors run disabled for interrupts. In other words, it may be desired to postpone a piece of work until all processors have enabled for interrupts since the work has been scheduled. The present invention provides an efficient and effective mechanism for effecting this desired serialization. Other applications will occur readily to those skilled in the art, as well.

We claim:

1. In a multiprocessing system having a control program, in which data objects are shared among processes, a method for serializing references to a data object by the processes so as to prevent invalid references to the data object by any process when an operation requiring exclusive access is performed by another process, comprising the steps of:
   (a) permitting said processes to reference data objects on a shared access basis without obtaining a shared lock;
   (b) monitoring a point of execution of the control program which is common to all processes in the system, which occurs regularly in the process' execution and across which no references to any data object can be maintained by any process, except references using locks;
   (c) establishing a system reference point which occurs after each process in the system has passed said point of execution at least once since the last such system reference point;
   (d) requesting an operation requiring exclusive access on a selected data object;
   (e) preventing subsequent references by other processes to said selected data object;
   (f) waiting until two said system reference points have occurred; and
   (g) then performing said requested operation.

2. In a multiprocessing system having a control program, in which data objects are shared among processes and references are permitted to those data objects without the requirement of a lock, a method for preventing invalid references to a data object by any process when an operation requiring exclusive access is performed by another process, comprising the steps of:
   (a) monitoring a point of execution of the control program which is common to all processes in the system, which occurs regularly in the processes' execution and across which no references to any data object can be maintained by any proces, except references using locks;
   (b) establishing a system reference point which occurs after each process in the system has passed said point of execution at least once since the last such system reference point, by periodically determining which processes have passed said monitored point of execution since the last said system reference point and establishing said system reference point when it is determined that all system processes have so passed said system reference point;
   (c) requesting an operation requiring exclusive access on a selected data object;
   (d) preventing subsequent references by other processes to said selected data object;
   (e) waiting until two said system reference points have occurred; and
   (f) then performing said requested operation.

3. A method according to claim 2 wherein said step of monitoring is performed by setting a boolean variable in a memory area of said system when it is determined that said point of execution has been passed for each process.

4. A method according to claim 3 wherein said step of establishing a system reference point is performed by periodically determining whether all said boolean variables have been set for each process in said system since the last said system reference point.

5. A method according to claim 4 wherein said step of establishing a system reference point is further performed by first resetting all of said boolean variables after it has been determined that all said boolean variables have been set for each process in said system since the last said system reference point, and then establishing said present system reference point.

6. A method according to claim 2 wherein said step of waiting is performed by placing said requested operation in a processing queue, and wherein said step of performing said requested operation comprises the steps of:
   removing said requested operation from said processing queue; and
   enabling said requested operation for execution.

7. In a multiprocessing system comprising multiple processes, a method of serialization, comprising:
   (a) permitting said processes to begin and terminate certain intervals of execution without explicit indication of such events;
   (b) monitoring one or more points of execution of the system, at least one of which occurs regularly in each process' execution and is not contained in any such interval; and (c) establishing a system reference point which occurs after each process in the system has passed said point of execution at least once since the last such system reference point; and (d) determining the termination of execution of any currently active intervals by waiting for two system reference points to subsequently occur.

8. A method for scheduling a processing task in a multitasking sytem where the task requires controlled access to a system resource and where references are permitted to that system resource without the requirement of a lock, said method comprising:

preventing subsequent access to said system resource;

deferring said processing task requiring controlled access;

monitoring a point of execution which is common to all tasks in the system and across which no resource references can be maintained by any processing task, except references using locks;

declaring a system reference point after each task in the system has passed said point of execution at least once since the last such system reference point;

enabling said processing task for execution after two of said system reference points have occurred.

9. A method according to claim 8 wherein said monitoring and declaring steps are performed by a system control program.

10. A method according to claim 8 further comprising the step of establishing three processing tasks queues, wherein said deferring step is performed by placing said processing task in a first processing queue, and wherein said enabling step comprises:

recognizing said system reference point declaration;

transferring all processing tasks to said third processing queue from said second processing queue upon said system reference point declaration recognition;

transferring all processing tasks to said second processing queue from said first processing queue upon said system reference point declaration recognition;

executing said processing tasks from said third processing queue.

* * * * *